Patented July 3, 1928.

1,675,786

UNITED STATES PATENT OFFICE.

MAX BUCHNER, OF HANOVER-KLEEFELD, GERMANY, ASSIGNOR TO ALBERT FRITZ MEYERHOFER, OF ZURICH, SWITZERLAND.

PROCESS FOR THE PRODUCTION OF CARBONATES.

No Drawing. Application filed June 18, 1925, Serial No. 38,100, and in Germany June 14, 1924.

This invention relates to the manufacturing of hydroxides and carbonates and specially of soluble carbonates and hydroxides from fluorides, such carbonates or hydroxides being used for the conversion with the fluoride, the base of which gives an insoluble fluor-compound.

The conversion is carried out, in accordance with the invention, at higher temperature and under pressure, in presence of little water, generally in presence of a quantity of water which is not sufficient for dissolving but at the utmost for a saturated solution.

Sodium fluoride is treated for instance with earth alkaline hydroxide or earth alkaline carbonate in presence of little water at 80° C., preferably in the autoclave. Higher temperature may be applied in order to attain easily a pressure of several atmospheres.

By the new process applied to sodium fluoride and carbonate of lime after the formula:

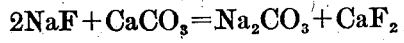

$$2NaF + CaCO_3 = Na_2CO_3 + CaF_2$$

sodium carbonate is quantitatively produced. The special working conditions have had the rather surprising effect of a complete conversion.

When working with little water a portion of the sodium carbonate is separated at once. The separation of the sodium carbonate from the fluorspar is effected with little water.

The new process is applicable in general for any hydroxides and carbonates and corresponding initial materials.

For the production of carbonate, especially the production of sodium carbonate, the process consists in carrying out the conversion in presence of carbonic acid, whereby the separation is further accelerated, and the obtention of a pressure above the atmospheric is rendered possible.

Instead of free carbonic acid substances may be introduced which separate carbonic acid, for instance bicarbonate. One might further proceed in such a manner that the quantity of carbonic acid is sufficient for the formation of bicarbonate, for instance sodium bicarbonate. In this manner higher concentrations are possible. When the pressure sinks, carbonic acid is blown off and sodium carbonate is produced. In this case one works in two stages carrying out for instance the formation of bicarbonate at a lower temperature and the decomposition to sodium carbonate at a higher temperature.

I claim:

1. The improvement in the art of obtaining soluble carbonates from fluorides by reaction with carbonates that produce therewith insoluble fluorides, which comprises carrying out the reaction under pressure above atmospheric pressure.

2. The improvement in the art of obtaining soluble carbonates from fluorides by reaction with carbonates that produce therewith insoluble fluorides, which comprises carrying out the reaction under pressure above atmospheric pressure at an elevated temperature.

3. The improvement in the art of obtaining soluble carbonates from fluorides by reaction with carbonates that produce therewith insoluble fluorides; which comprises carrying out the reaction under pressure above atmospheric pressure and in the presence of a liquid insufficient to dissolve the soluble products of the reaction.

4. The improvement in the art of obtaining soluble carbonates from fluorids by reaction with carbonates that produce therewith insoluble fluorides, which comprises carrying out the reaction under pressure above atmospheric pressure at an elevated temperature and in the presence of a liquid insufficient to dissolve the soluble product of the reaction.

5. In the art of obtaining soluble carbonates from fluorids by reaction with carbonates, the improvement which comprises carrying out the reaction with the latter carbonates and hydroxides in concentrated solutions and under pressure above atmospheric pressure.

6. In the art of obtaining soluble carbonates from fluorids by reaction with carbonates, the improvement which comprises carrying out the reaction with the latter carbonates in concentrated solutions under pressure above atmospheric pressure and at an elevated temperature.

7. In the art of converting fluorides into carbonates by reaction with a carbonate capable of forming an insoluble fluoride therewith, the improvement which comprises carrying out the reaction in the presence of carbonic acid under a pressure above atmospheric pressure.

8. In the art of converting fluorides into carbonates by reaction with a carbonate capable of forming an insoluble fluoride therewith, the improvement which comprises carrying out the reaction in the presence of carbonic acid under a pressure above atmospheric pressure and in the presence of a small quantity of liquid to produce at least a saturated solution of the soluble carbonate obtained.

9. The art of converting fluorides into carbonates by reacting thereon with a carbonate capable of forming therewith an insoluble fluoride under pressure above atmospheric pressure and in the presence of carbonic acid.

10. The art of converting fluorides into carbonates by reacting thereon with a carbonate capable of forming therewith an insoluble fluoride, under pressure above atmospheric pressure and in the presence of carbonic acid and a quantity of liquid not greater than is sufficient to produce a saturated solution of the resulting soluble carbonate.

11. The art of converting fluorides into carbonates by reacting thereon with a carbonate capable of forming therewith an insoluble fluoride and a soluble carbonate in the presence of another carbonate capable of splitting off carbonic acid, said reaction taking place with a quantity of liquid not greater than is sufficient to produce a saturated solution of the resulting soluble carbonate.

12. The art of converting fluorides into carbonates by reacting thereon with a carbonate capable of forming therewith an insoluble fluoride and a soluble carbonate in the presence of another carbonate capable of splitting off carbonic acid, said reaction taking place under a pressure above atmospheric pressure and with a quantity of liquid not greater than is sufficient to produce a saturated solution of the resulting soluble carbonate.

13. The art of converting fluorides into carbonates by reacting thereon with a carbonate capable of forming therewith an insoluble fluoride and a soluble carbonate in the presence of another carbonate capable of splitting off carbonic acid, said reaction taking place under a pressure above atmospheric pressure and with a quantity of liquid not greater than is sufficient to produce a saturated solution of the resulting soluble carbonate, and at a temperature above atmospheric temperature.

14. The art of converting fluorides into carbonates by reacting thereon with a carbonate capable of forming an insoluble fluoride, in the presence of a bi-carbonate that splits off carbonic acid, under pressure above atmospheric pressure and at a temperature above atmospheric temperature.

15. The art of converting fluorides into carbonates by reacting thereon with a carbonate capable of forming an insoluble fluoride, under pressure in the presence of carbonic acid and in the presence of a small amount of water the quantity of which is not greater than sufficient to form a saturated solution of the resulting soluble product, and at a temperature to insure the formation of carbonate.

16. The art of converting fluorides into carbonates by reacting thereon with a carbonate, capable of forming an insoluble fluoride, under pressure above atmospheric pressure in the presence of carbonic acid to form intermediate bi-carbonates, and converting the latter into carbonates by elevating the temperature.

17. The art of converting fluorides into carbonates by reacting thereon with a carbonate capable of forming an insoluble fluoride, under pressure above atmospheric pressure in the presence of carbonic acid and a small amount of water, the quantity of which is not greater than sufficient to form a saturated solution of the resulting soluble product to form intermediate bi-carbonates, and converting the latter into carbonates by elevating the temperature.

In testimony that I claim the foregoing as my invention, I have signed my name.

Dr. MAX BUCHNER.